United States Patent [19]
Kikuchi

[11] Patent Number: 5,779,378
[45] Date of Patent: Jul. 14, 1998

[54] CONTINUOUS FORM PRINTER

[75] Inventor: Shinji Kikuchi, Tokyo, Japan

[73] Assignee: Asahi Kogaku Kogyo Kabushiki Kaisha, Tokyo, Japan

[21] Appl. No.: 832,182

[22] Filed: Apr. 8, 1997

[30] Foreign Application Priority Data

Apr. 9, 1996 [JP] Japan .................................. 8-111953

[51] Int. Cl.$^6$ ...................................................... B41J 11/26
[52] U.S. Cl. ...................... 400/616.2; 400/582; 400/583; 400/709; 226/24; 226/75; 226/45; 355/309; 355/316; 347/264; 364/469.03
[58] Field of Search .......................... 400/611, 616.1, 400/616.2, 582, 583, 690.4, 645; 226/24, 45, 75; 101/226, 248; 355/309, 316; 347/264; 346/136; 364/469.01, 469.03

[56] References Cited

U.S. PATENT DOCUMENTS

| | | | |
|---|---|---|---|
| 4,485,949 | 12/1984 | Gebhart et al. | 226/45 |
| 4,839,814 | 6/1989 | Steidel | 101/248 |
| 4,949,104 | 8/1990 | Negoro et al. | . |
| 4,998,835 | 3/1991 | Negishi et al. | . |
| 5,026,183 | 6/1991 | Oshima et al. | 400/611 |
| 5,027,999 | 7/1991 | Ferguson | 400/616.1 |
| 5,071,273 | 12/1991 | Kato | 400/582 |
| 5,088,843 | 2/1992 | Hori | 400/690.4 |
| 5,222,820 | 6/1993 | Kamei et al. | 400/645 |
| 5,386,772 | 2/1995 | Tolle et al. | 101/248 |
| 5,480,244 | 1/1996 | Senda | 400/582 |
| 5,493,318 | 2/1996 | Negoro et al. | . |
| 5,516,220 | 5/1996 | Ishikawa et al. | . |
| 5,520,383 | 5/1996 | Amagai et al. | 400/582 |
| 5,532,811 | 7/1996 | Nishikawa et al. | . |
| 5,544,965 | 8/1996 | Kamoda et al. | 400/582 |
| 5,564,845 | 10/1996 | Yamaguchi et al. | . |
| 5,649,274 | 7/1997 | Honda et al. | 226/27 |
| 5,676,479 | 10/1997 | Yamaguchi | 400/582 |

*Primary Examiner*—Eugene H. Eickholt
*Attorney, Agent, or Firm*—Greenblum & Bernstein P.L.C.

[57] ABSTRACT

A printer includes a tractor unit for feeding continuous form paper, encoders driven in synchronization with a tractor belt, and detecting sensors for detecting rotation of the encoders to generate feed pulses at a standard interval. The printer further includes a paper top sensor which detects a leading edge of the continuous form paper to generate a paper top signal and is arranged to control the feeding of the paper based on a feed pulse generated after the paper top signal. In order to compensate for a delay of the paper top signal, the printer controller is arranged to determine if there is a delay in the paper top signal by comparing the time interval between the paper top signal and the feed pulse with a threshold value. The printer is so arranged that the threshold value is stored in a non-volatile memory and can be set after assembly of the printer. A positioning error of the paper top sensor with respect to the tractor unit due to imprecise mounting of the paper top sensor can be compensated by adjusting the threshold value.

20 Claims, 17 Drawing Sheets

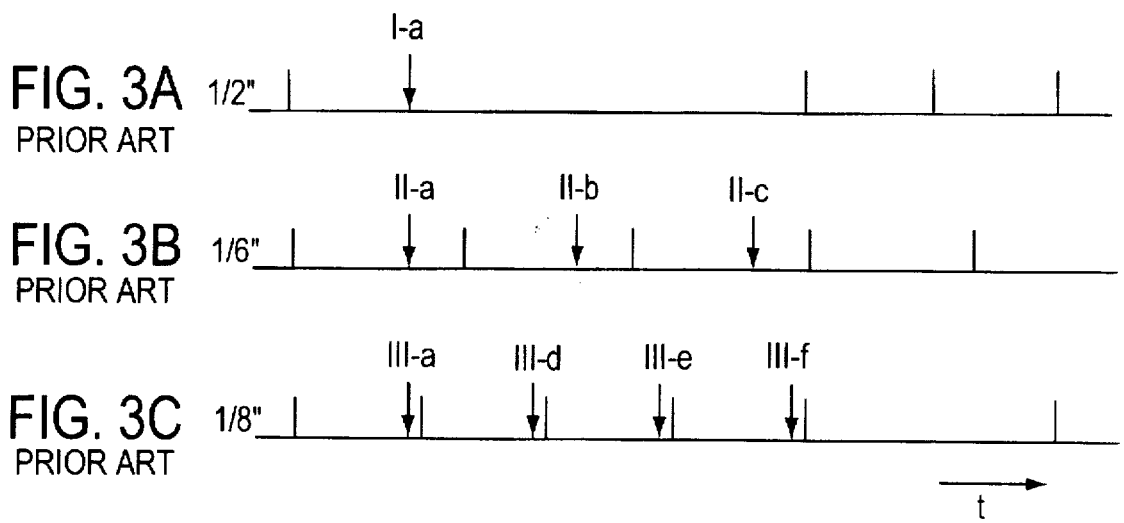
FIG. 3A PRIOR ART
FIG. 3B PRIOR ART
FIG. 3C PRIOR ART
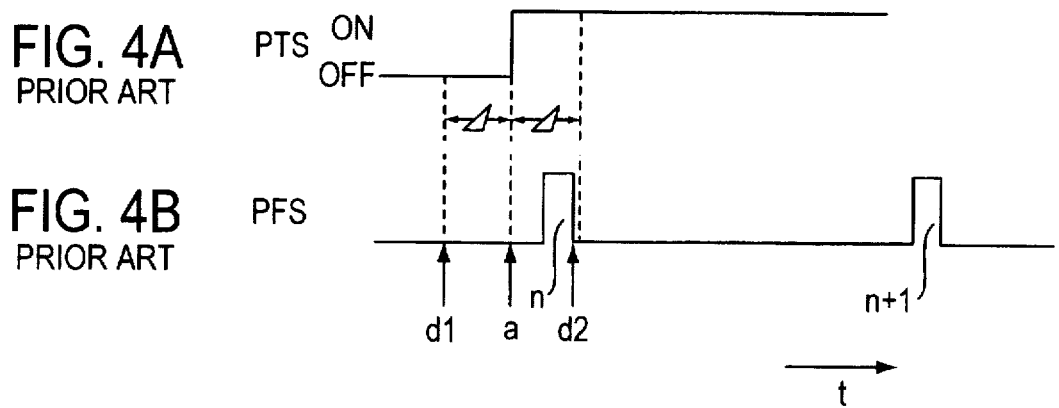
FIG. 4A PRIOR ART
FIG. 4B PRIOR ART

CONTINUOUS FORM PRINTER

BACKGROUND OF THE INVENTION

The present invention relates to a printer using continuous form paper.

Printers using continuous form paper are well known. Conventionally, the continuous form paper has a discrete page length defined by perforations between pages and, has feed holes at a certain interval (conventionally ½") on both sides thereof.

Conventionally, the printer includes a tractor unit which drives a pair of tractor belts having projections for engaging the feed holes of the paper. In order to provide feedback for control of the feeding of the paper, the tractor unit generally includes an encoder or the like driven in synchronization with the tractor belt for generating a feed pulse at a standard interval. The standard interval corresponds to the distance between the feed holes (conventionally ½"). The printer further includes a paper top sensor for detecting a leading edge of the continuous form paper, and is arranged to control the feed of the paper based on the feed pulse generated after the detection of the leading edge by the paper top sensor.

Generally, the page length of the continuous form paper is a multiple of ½" (for example, 3") and, as shown in FIG. 1A, perforations for separating one page of the fanfold continuous form paper from the next page are positioned at a center position between adjacent feed holes.

In addition, continuous form paper having a page length that is a multiple of ⅙" or ⅛" (for example, 1⅚" or 2⅝") has been introduced, as shown in FIGS. 1B and 1C.

FIGS. 2A, 2B and 2C respectively show the relationship between feed holes and perforations. As shown in FIG. 2B, for a page length that is a multiple of ⅙", the relationship between the perforations and the feed holes has three patterns: (a) a center position between adjacent feed holes, (b) ¹⁄₁₂" from the right closest feed hole, and (c) ¹⁄₁₂" from the left closest feed hole. Similarly, as shown in FIG. 2C, for a page length that is a multiple of ⅛", the relationship between the perforations and the feed holes has four patterns: (a) a center position between adjacent feed holes, (d) ⅛" from the right closest feed hole, (e) centered on a feed hole and (f) ⅛" from the left closest feed hole. Due to these relationships, the distance from the leading edge of the paper to the closest feed hole varies, and thus, it is difficult to define the position of the leading edge of the paper accurately in relation to the position of the feed holes.

To solve the above noted problem, it is possible to provide a continuous form printer generating three kinds of signals responsive to the feeding of the paper ⅛", ⅙" and ½", respectively. The printer may include two encoders to generate signals responsive to the feeding of the paper ⅛" and ⅙", and arranged to create a signal responsive to the feeding of the paper of ½" by performing an AND operation of the signals for ⅛" and ⅙" feeds.

As shown in FIG. 3B, if a signal responsive to the feeding of the paper of ⅙" is used for paper that has a page length that is a multiple of ⅙", a paper top signal may be generated as shown by II-a, II-b and II-c (respectively corresponding to the perforation positions a, b and c in FIG. 2B). Thus, the relationship between the paper top signal (PTS) and the feed pulses is constant. Similarly, as shown in FIG. 3C, if a signal responsive to the feeding of the paper of ⅛" is used for paper that has a page length that is a multiple of ⅛", a paper top signal may be generated as shown by III-a, III-d, III-e and III-f (respectively corresponding to the perforation positions a, d, e and f in FIG. 2C). Thus, the relationship between the paper top signal and the feed pulses is constant.

However, since the leading edge of the continuous form paper is formed by cutting or ripping pages at a perforation, the leading edge may be irregular. This irregularity of the leading edge changes the timing when the leading edge is detected by the paper top sensor. Further, the continuous form paper may bend, which also changes the timing when the leading edge is detected by the paper top sensor.

FIGS. 4A and 4B are timing charts showing an example of a relationship between paper top signals and feed pulses. Assuming that the timing of the paper top signal has a deviation of 2Δ shown in FIG. 4A, the timing deviates from d1 to d2 shown in FIG. 4B. If the paper top signal is designed to be generated before the feed pulse n, but is instead generated after the feed pulse n (such as d2 in FIG. 4B), the printer will then control the feed of the paper based on the feed pulse n+1 as being the feed pulse related to the leading edge. This causes a deviation of the printing position on the continuous form paper.

This problem was addressed in U.S. Pat. No. 5,564,845, which discloses a printer arranged to count the number of motor pulses issued to a driving motor (used for driving the tractor unit) after a signal is generated by the paper top sensor but before the feed pulse is generated. In particular, the interval between the motor pulses is ¹⁄₄₃ of the ⅛" feed pulse. If the counted number of motor pulses is more than a predetermined threshold value (for example 23), the paper top signal is assumed to have been delayed, and therefore the printer compensates in determining the related feed pulse, and if the counted number of motor pulses is less than the threshold value, the controller does not perform this compensation. In particular, the threshold value is determined after mounting the tractor unit, the paper top sensor and the encoders to the printer.

However, the above-mentioned threshold is affected by the relative position of the paper top sensor with respective to the tractor unit. That is, if the paper top sensor is not positioned precisely, a predetermined threshold is not as useful. Accordingly, the paper top sensor should be positioned precisely, for example, within a preciseness of ¹⁄₁₀₀ inch, which complicates the assembly of the printer.

SUMMARY OF THE INVENTION

It is therefore an object of the present invention to provide a continuous-form printer which can be assembled in a simple manner.

According to one aspect of the present invention, a printer using continuous form paper includes a tractor unit for feeding the paper, a feed pulse generating device for generating a feed pulse responsive to a feeding interval, a paper top sensor for detecting the leading edge of the paper and generating a paper top signal, a comparator for comparing a time interval from the paper top signal to a feed pulse with a threshold, a non-volatile memory, and a controller which controls the tractor unit and controls printing operation, onto the continuous form paper according to the feed pulse. The controller is arranged to change the timing of the start of the printing operation according to a result of the comparing. The threshold is adjustable and can be stored in the non-volatile memory.

As constructed above, since the threshold is adjustable and therefore can be determined after the assembling of the printer, it is unnecessary to mount the paper top sensor to the printer with very high precision. Thus, the manufacturing time for assembling the printer can be reduced.

In one preferred embodiment, the threshold is determined by measuring a time interval from the paper top signal to the nearest feed pulse, using test paper having a certain rigidity and a regular leading edge. By using such test paper, it is possible to determine correct timing for the paper top signal (without any delay). It is preferable that the non-volatile memory is an EEPROM (electrically erasable PROM) and that the controller reads the threshold from the memory at the beginning of the printing process.

Further, the comparator detects the time interval by counting motor pulses of a tractor motor of the tractor unit. Since the interval between motor pulses is generally finer than that between the feed pulses, it is possible to detect the above-mentioned time interval precisely. In the case of an electrophotographic printer, the controller can be arranged to change the timing of the start of control of the laser scanning unit according to the output from the comparing means so that any delay of the paper top signal is compensated for.

The continuous form paper has feed holes at a predetermined pitch on both sides thereof and has perforations at a predetermined interval defining a page length. The page length is a multiple of a predetermined value. In this case, the feed pulse generating means generates feed pulses responsive to a feeding interval equal to the predetermined value.

In a particular arrangement, the feed pulse generating device comprises a plurality of encoders which generate feed pulses responsive to different feeding intervals. The plurality of encoders may be first and second encoders which respectively generate first and second feed pulses. It is preferable to provide a third feed pulse by combining the first and second feed pulses. In particular, the first feed pulse may be generated at intervals of ⅛ inch,. the second feed pulse may be generated at intervals of ⅙ inch, and the third feed pulse may be generated at intervals of ½ inch.

In another preferred embodiment, the tractor unit further includes a pair of tractor belts with projections engaging the feed holes of the continuous form paper and driving pulleys for driving the tractor belts. The driving pulleys are provided with an encoder at a driving shaft thereof. Further, the feed pulse generating device may further include at least one detecting sensor for detecting the movement of the encoder, such as a photo-interrupter arranged to detect the passage of slits of the encoder.

DESCRIPTION OF THE ACCOMPANYING DRAWINGS

FIGS. 3A, 3B and 3C are timing charts showing a relationship between feed pulses and paper top signals from a paper top sensor;

FIGS. 4A and 4B are timing charts showing a relationship between feed pulses and paper top signals;

DESCRIPTION OF THE EMBODIMENTS

Figure 5:
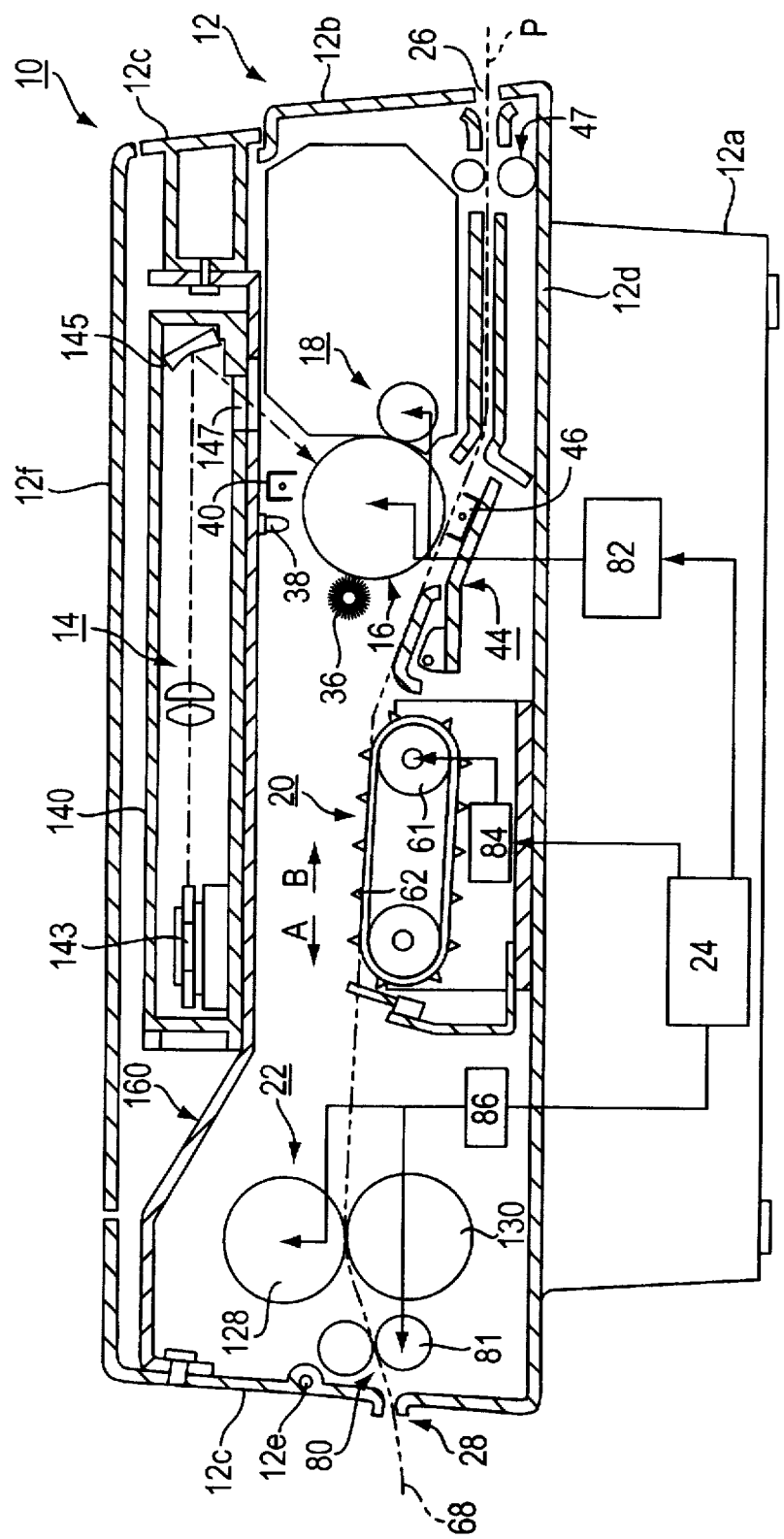
FIG. 5 is a side sectional view showing an internal structure of a printer.

FIG. 5 is a side view showing the internal structure of a printer 10. The printer 10 includes a housing 12, a laser scanning unit 14, a photo-conductive drum 16, a developing unit 18, a transfer unit 44, a tractor unit 20, and a fixing unit 22.

The housing 12 is divided into lower, middle and upper portions 12a, 12b, and 12c respectively. The lower portion 12a houses a controller 24.

The middle housing 12b houses the fixing unit 22, the photo-conductive drum 16, the developing unit 18, the transfer unit 44, and the tractor unit 20. A paper inlet 26 and a paper outlet 28 are provided on opposite sides of the middle housing 12b. A paper path 68 is defined extending from the inlet 26, through a pair of back tension rollers 47, passing between the photoconductive drum 16 and the transfer unit 44, extending over the tractor unit 20, passing through the fixing unit 22, and extending to the outlet 28.

The upper housing 12c is provided with a support frame 160 for supporting the scanning unit 14. The upper portion 12c is rotatably supported relative to the middle housing 12b by a pivot assembly 12e, and can be rotated away from the middle housing 12b, thereby allowing access to the paper path 68.

Initially, paper P (continuous form type) is inserted from the inlet 26 with the upper housing 12c in an open position, and is fed by hand through the pair of back tension rollers 47, between the photoconductive drum 16 and the transfer unit 44, to the tractor unit 20. The tractor unit 20 is arranged on a main chassis 12d of the housing 12 to feed the paper P in a forward direction (arrow A) and a reverse direction (arrow B) along the paper path 68.

During a printing process, the scanning unit 14 is controlled by the controller 24 to generate a scanning laser beam that scans along the length of the photoconductive drum 16 while the photoconductive drum 16 is rotated in order to form a latent image on the photoconductive drum 16.

The developing unit 18 applies toner to the latent image to form a toner image on the photoconductive drum 16. The transfer unit 44 is disposed on the opposite side of the paper path 68 from the photoconductive drum 16 and transfers the toner image from the photoconductive drum 16 onto the paper P.

The fixing unit 22 includes a heat roller 128 and a pressure roller 130, for fixing a toner image to the paper P by heat and pressure. The heat roller 128 is driven by a fixing unit motor 86. The pressure roller 130 is freely rotatable and movable in a vertical direction. A pair of discharge rollers 80 are provided between the outlet 28 and the fixing unit 22, the lower discharge roller 81 is driven by the fixing unit motor 86 in synchronization with the heat roller 128.

The paper P is fed forward by the tractor unit 20 in correspondence to the rotation of the photoconductive drum 16 during the above operations and thereafter to advance the paper P to the fixing unit 22. Although the heat roller 128, pressure roller 130 and discharge rollers 80 are in contact with the paper P during printing, the feeding speed is determined by the tractor unit 20.

The printer 10 also includes a toner cleaning brush 36 for removing toner that remains on the photoconductive surface of the drum 16, a discharging unit 38 for removing a charge on the photoconductive drum 16, and a charging unit 40 for uniformly charging the photoconductive surface of the drum 16, that are provided around the circumference of the photo-conductive drum 16.

The controller 24 controls a main motor 82 to drive the photo-conductive drum 16 and the developing unit 18, a tractor motor 84 to feed the paper P, and the fixing unit motor 86 for driving both the heat roller 128 and the lower discharge roller 81.

Figure 6:
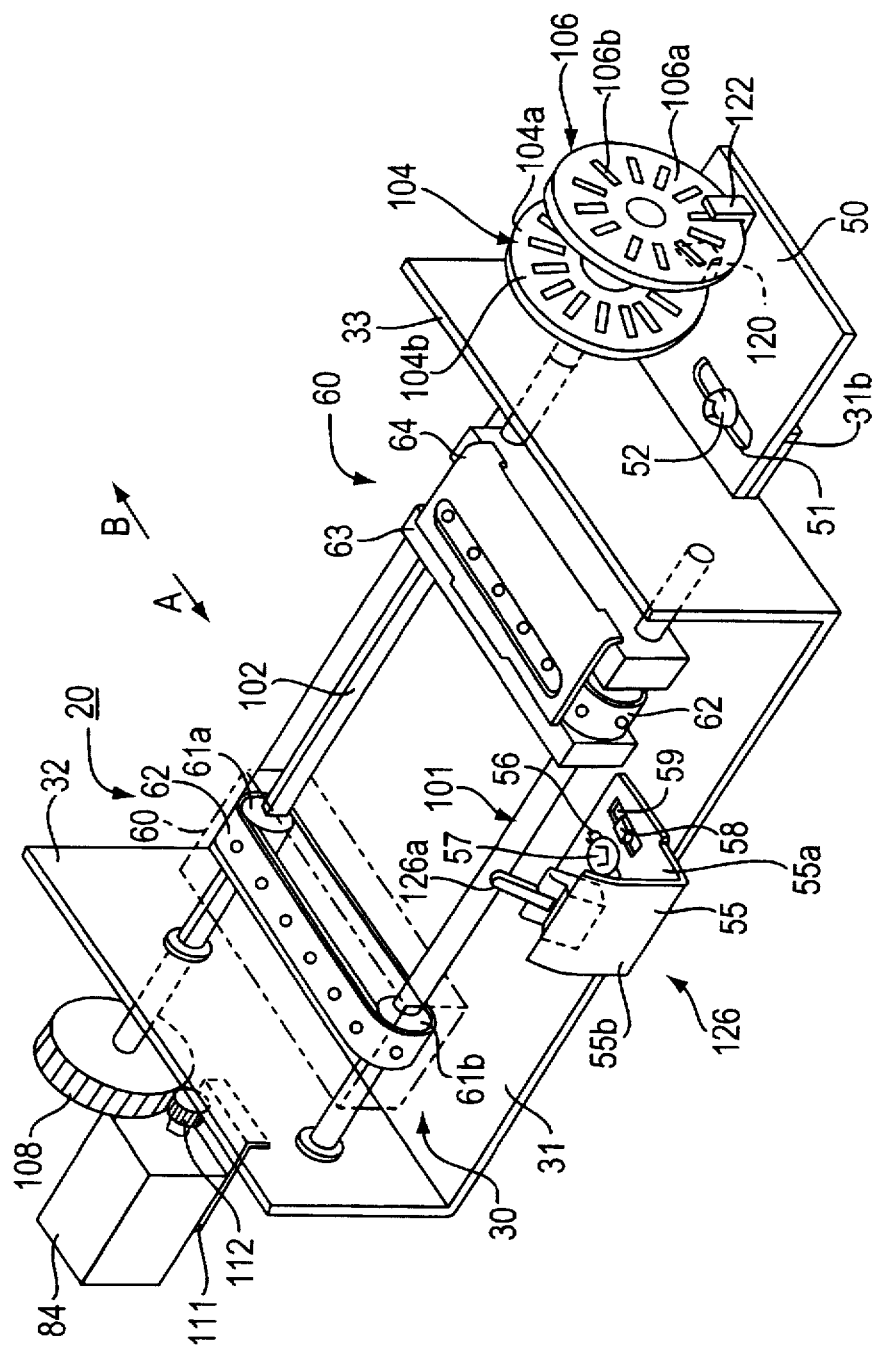
FIG. 6 is a perspective view of a tractor unit of the printer.
Figure 7:
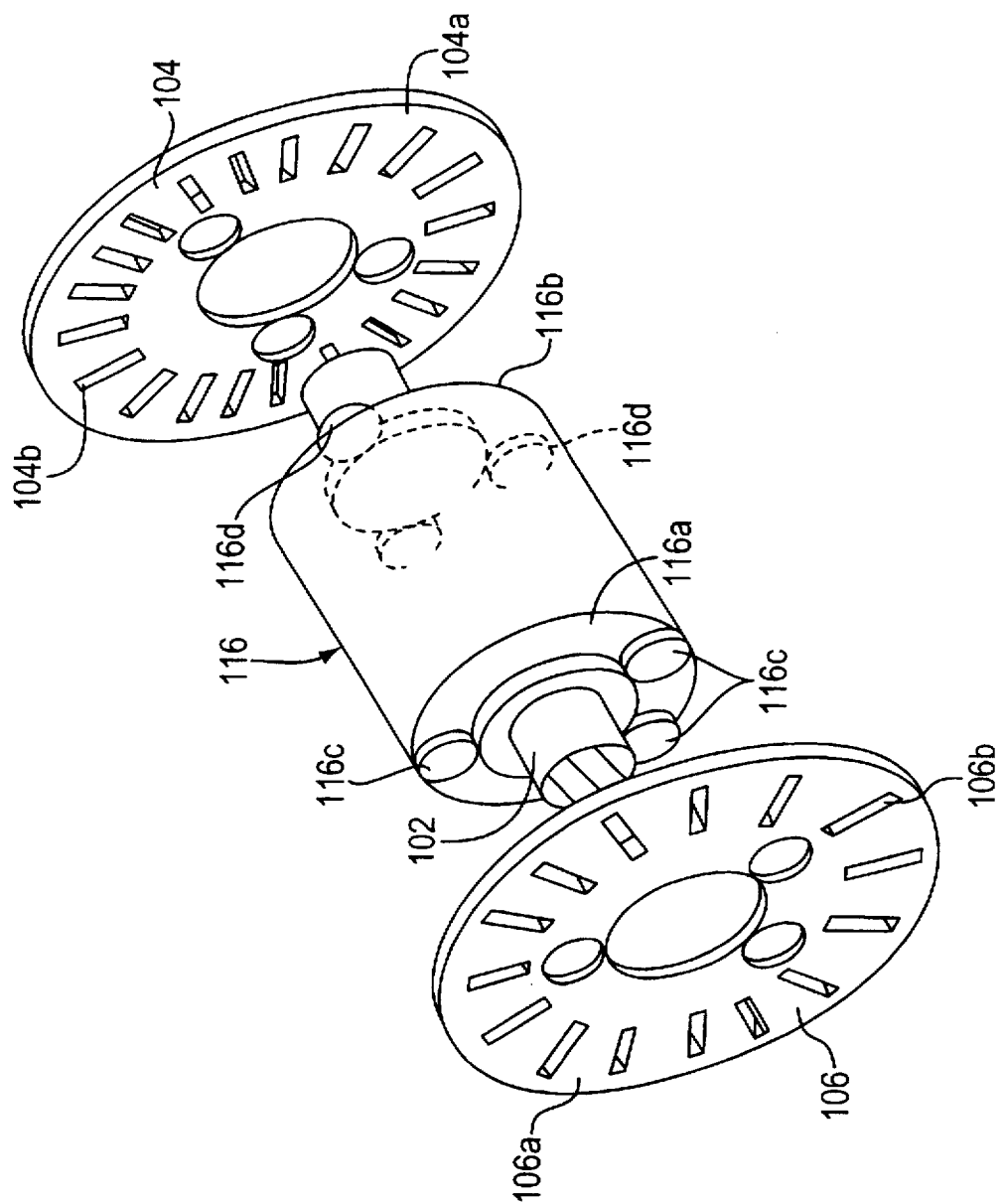
FIG. 7 is an exploded perspective view showing encoders used in conjunction with the tractor unit.
Figure 8:
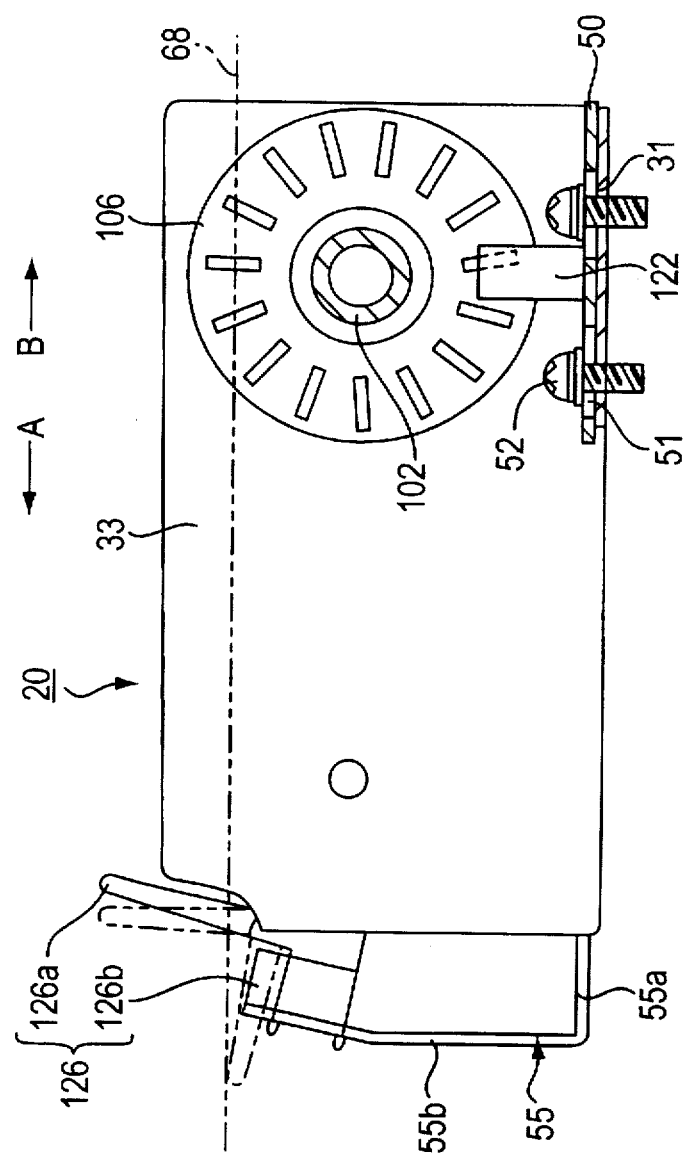
FIG. 8 is a side view of the tractor unit.

A detailed description of the tractor unit 20 is now given with reference to FIGS. 6 to 8. FIG. 6 is a perspective view of the tractor unit 20. The tractor unit 20 includes a U-shaped tractor frame 30 provided on the main chassis 12d (FIG. 5). The U-shaped tractor frame 30 includes a bottom plate 31 and two side plates 32. The tractor unit 20 further includes a pair of tractors 60 arranged parallel with each other along the paper feed path 68 (FIG. 5). Each tractor 60 has a tractor belt 62 having projections which engage with the feed holes of the paper P, a pair of pulleys 61a and 61b for driving the tractor belt 62, and an upper cover 64 for securing the engagement between the feed holes and the projections of the tractor belt 62.

The pulleys 61a and 61b of each tractor 60 are supported by a support shaft 101 and a drive shaft 102, respectively. Both the support shaft 101 and the drive shaft 102 extend between the side plates 32 and 33. The drive shaft 102 is driven by a driven gear 108 at an end near the side plate 32, and drives the tractors 60. The tractor motor 84 is mounted in a motor bracket 111 fixed to the outside of the side plate 32. The tractor motor 84 drives the driven gear 108 via a pinion 112 mounted to a motor shaft 84a.

Feed pulses responsive to the feeding of the paper P by intervals of ⅛", ⅙" and ½ are generated by a first rotary encoder 104 and a second rotary encoder 106. The first rotary encoder 104 and the second rotary encoder 106 are coaxially attached to the drive shaft 102. The first encoder 104 generates a feed pulse for every ⅙" of paper feed and the second encoder 106 generates a feed pulse for every ⅛" of paper feed. The movement of the first encoder 104 and the second encoder 106 are detected by first and second sensors 120 and 122, respectively.

FIG. 7 is an exploded perspective view of the arrangement of the first and second encoders 104 and 106. The first encoder 104 includes a disk 104a having, for example, 20 encoder slits 104b extending radially at intervals corresponding to ⅙" of paper feed. The second encoder 106 includes a disk 106a having, for example, 15 encoder slits 106b extending radially at intervals corresponding to ⅛" of paper feed. The slits 104b and 106b of the first and second encoders 104 and 106 are of the same size and radial position.

The first and second encoders 104 and 106 are mounted to a positioning sleeve 116 in such a manner that every third slit 106b of the second encoder 106 and every fourth slit 104b of the first encoder 104 are aligned, thus to represent a feed pulse of intervals corresponding to ½" of paper P feed. In this example, a total of five predetermined combinations of each of the slits 104b and 106b respectively are thus aligned with each other.

In order to align the first and second encoders 104 and 106 appropriately, the positioning sleeve 116 is provided with three bosses 116c on one side surface 116a, and three opposing bosses 116d on the parallel opposite side surface 116b, each of the bosses being provided adjacent to the drive shaft 102. The bosses 116c and 116d mate with corresponding positioning holes provided in the first and second encoders 104 and 106, thus accurately determining the position of the encoders 104 and 106.

Referring again to FIG. 6, the first and second sensors 120 and 122 are, for example, photo-interrupter sensors including a light receiving element and a light emitting element. The first and second sensors 120 and 122 output OFF signals when light is blocked by the encoders 104 and 106 and ON signals when light passes through the slits 104b and 106b, respectively. The feed pulses are defined as: for a ⅙" feeding interval, the ON signal from the first sensor 120; for a ⅛" feeding interval, the ON signal from the second sensor 122; and for a ½" feeding interval, the ON signal from both the first and second sensors 120 and 122. A selector 124 (described below with reference to FIG. 9) is provided for selecting the feed pulse from among ⅙", ⅛" and ½" to be monitored according to the required feeding interval. The controller 24 is able to monitor the feed of the paper P by any of three feed intervals.

In this embodiment, in order to perform an adjustment described below, the position of the first and second sensors 120 and 122 is adjustable in the paper feeding direction along the paper feed path 68 (shown by the arrows A and B in FIG. 6). In particular, the first and second sensors 120 and 122 are fixed to a mounting plate 50. The mounting plate 50 is supported on a base plate 31b extending from the bottom plate 31. The mounting plate 50 is provided with an elongated hole 51 that extends in the paper feeding direction. A screw 52 is inserted through the elongated hole 51 and engaged to a threaded hole (not shown) formed on the base plate 31b. Thus, the position of the first and second sensors 120 and 122 can be adjusted by loosening the screw 52, moving the mounting plate 50 and tightening the screw 52.

Figure 1A:
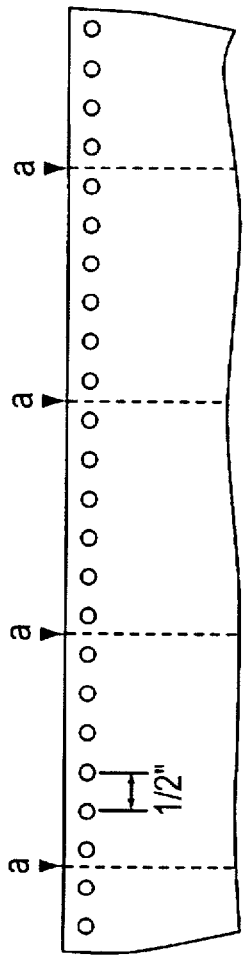
FIGS. 1A, 1B and 1C are schematic views of various continuous form papers having different page lengths.
Figure 1B:
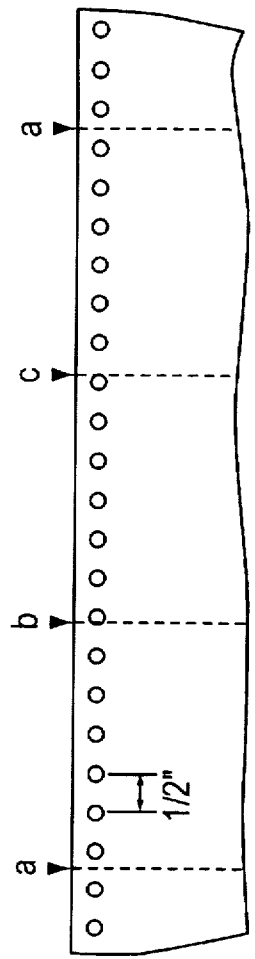
Figure 1C:
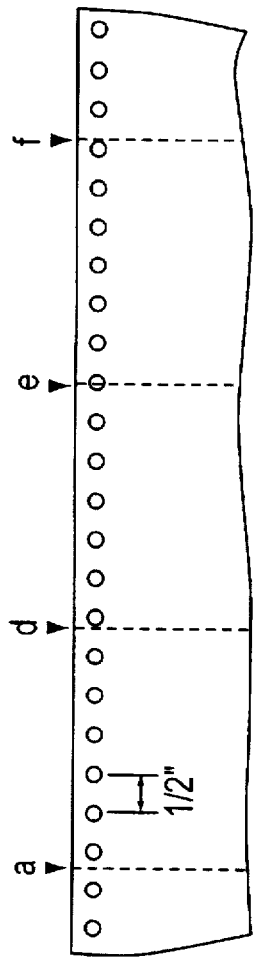

The tractor unit 20 is further provided with a paper top sensor 126 for detecting the leading edge of the paper P. As shown in FIG. 6, the paper top sensor 126 is positioned between the tractors 60 at one side of the tractor unit 20 such that as the paper P is fed forward (the direction indicated by the arrow A in FIG. 6) the paper P will contact the paper top sensor 126. FIG. 8 is a side view of the tractor unit 20. As shown in FIG. 8, the paper top sensor 126 includes an actuator 126a and a sensor body 126b. The paper top sensor 126 generates an OFF signal when the actuator 126a projects vertically (i.e., into the paper path 68 shown in FIG. 5), and generates an ON signal when the actuator 126a is pushed to a horizontal position (i.e., below the paper path 68) by the paper P. The controller 24 (FIG. 1) monitors the paper top sensor 126.

In the first embodiment, in order to perform an adjustment described below, the position of the paper top sensor 126 is also adjustable along the paper feed path 68 (as shown by arrows A and B in FIG. 6). In particular, as shown in FIG.

6, the paper top sensor 126 is fixed to a mounting member 55. The mounting member 55 includes a bottom portion 55a and an upright portion 55b to which the paper top sensor 126 is secured. The bottom portion 55a is provided with an elongated hole 56 that extends in the paper feeding direction. A screw 57 is inserted through the elongated hole 56 and engaged to a hole (not shown) on the bottom plate 31. Thus, the position of the top sensor 126 can be adjusted by loosening the screw 57, moving the mounting member 55 and tightening the screw 57. Further, for guiding the mounting member 55 in the paper feeding direction, the bottom portion 55a is provided with a guide groove 58 extending in the paper feeding direction, to which a square boss 59 provided on the bottom plate 31 engages.

As constructed above, both the position of the first and second sensors 120 and 122 and the position of the paper top sensor 126 can be adjusted in the paper feeding direction.

Figure 9:
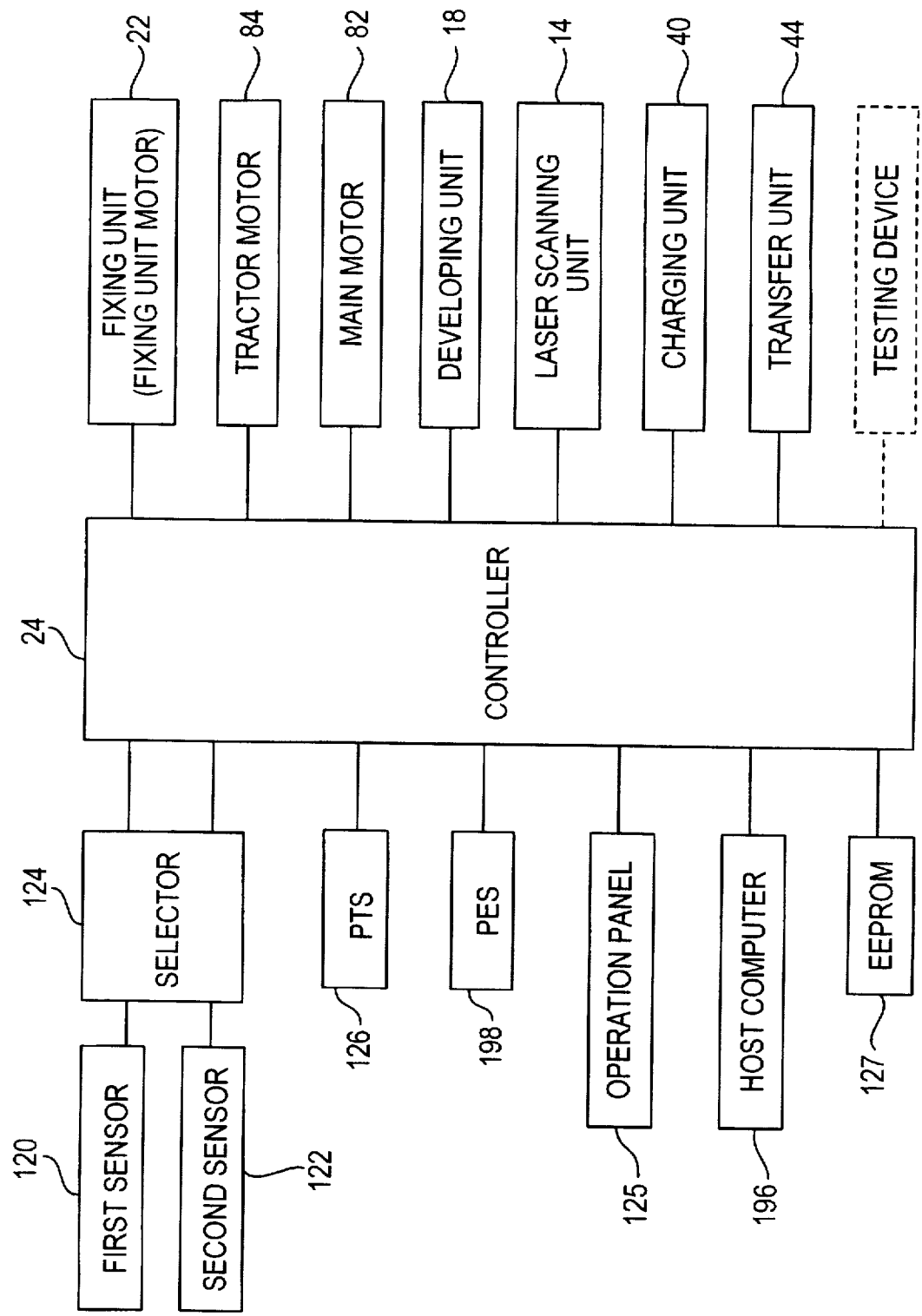
FIG. 9 is a block diagram of a control system of the printer.

A control of the printer 10 is now described with reference to FIGS. 9 through 18. FIG. 9 is a block diagram showing the control system for the printer 10. The controller 24 is connected to the laser scanning unit 14, the main motor 82, the developing unit 18, the fixing unit 22 (including the fixing motor 86), and the tractor motor 84. Further, the controller 24 is also connected to an operation panel 125 for the input of data, such as the feeding interval or the like, the paper top sensor 126 (PTS), the paper empty sensor 198 (PES), and a host computer 196 from which the controller 24 receives data, such as printing data, the feeding interval, or the like. The controller 24 is also connected to the first and second sensors 120 and 122 via the selector 124 and an EEPROM (electrically erasable PROM) 127 in which threshold data (described later) is stored.

Figure 10:
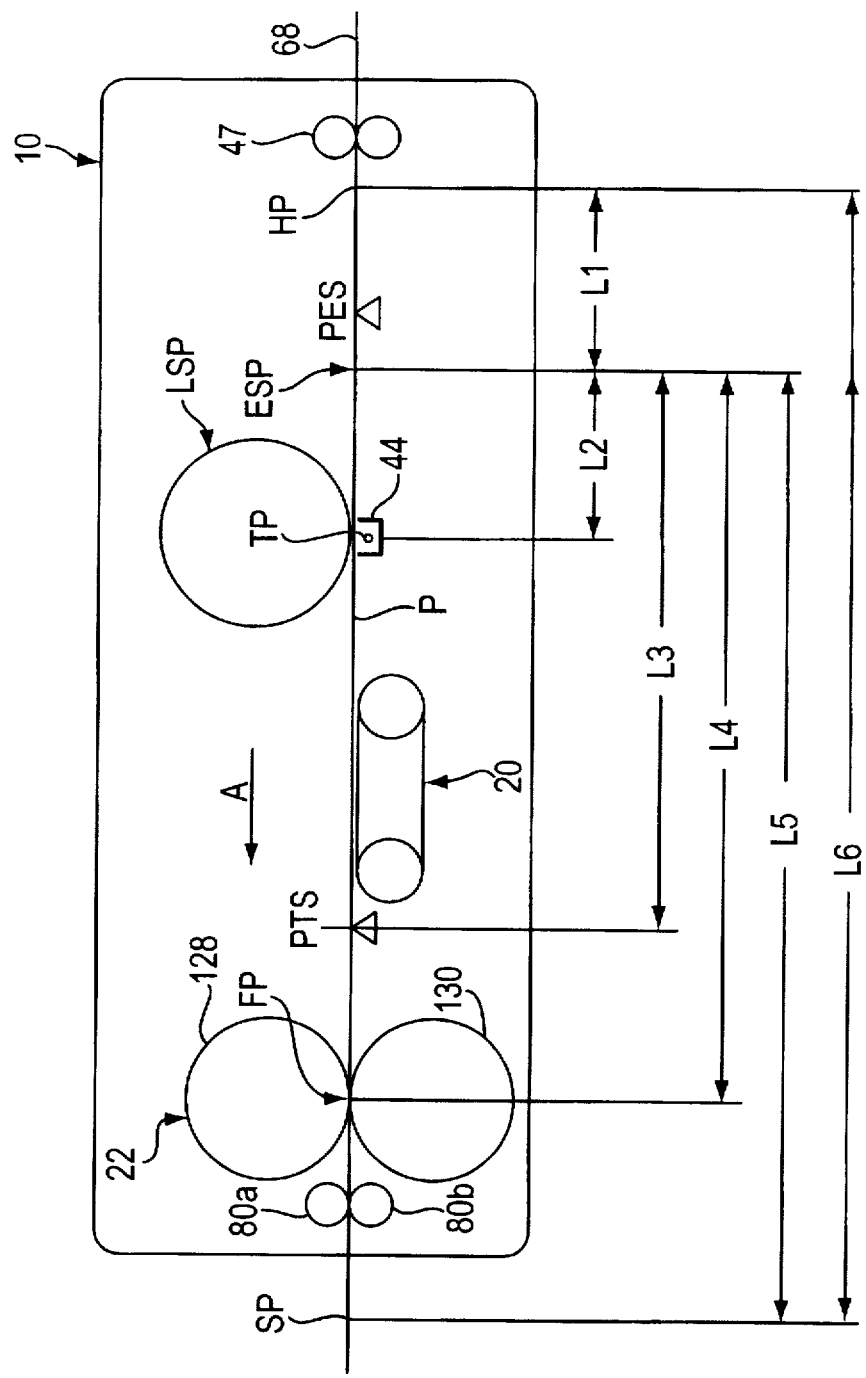
FIG. 10 is a schematic view showing sensor and control positions of the printer.

FIG. 10 is a schematic diagram showing various positions and length parameters defined in relation to the paper path 68 for use by the control process described herein. A transfer position TP is defined as the position between the photoconductive drum 16 and the transfer unit 44 at which the toner is transferred. A home position HP is defined as a predetermined position between the paper empty sensor PES and the pair of back tension rollers 47. A laser scanning position LSP is defined as a position on the surface of the photoconductive drum 16 onto which the scanning laser beam is emitted. An exposure start position ESP is defined as a position, along the paper path 68, upstream of the transfer position TP by a distance that is equal to the circumferential distance from the transfer position TP to the laser scanning position LSP, along the surface of the photoconductive drum 16. A fixing position FP is defined at the nip between the rollers 128 and 130 of the fixing unit 22. A paper top sensor position PTS is defined between the tractor unit 20 and the fixing unit 22 representing the position where the paper top sensor 126 is activated. Lastly, a stop position SP is defined at a predetermined distance outside of the outlet 28.

Six predetermined intervals along the paper path 68 are defined in the printer 10 based on the above positions: interval L1 between the home position HP and the exposure start position ESP; interval L2 between the exposure start position ESP and the transfer position TP; interval L3 between the exposure start position ESP and the paper top sensor position PTS; interval L4 between the exposure start position ESP and the fixing position FP; interval L5 between the exposure start position ESP and the stop position SP; and interval L6 between the home position HP and the stop position SP.

The printing process is now described with reference to FIGS. 11 through 18. At the beginning of the printing process, the controller 24 checks the heat roller 128 to determine if the roller 128 is hot enough for fixing (S100). If the roller 128 is not hot enough (N at step S100), the controller calls a warm-up operation (S102) which activates the heating means (for example, a halogen lamp) until the roller 128 is heated to a fixing temperature. Otherwise (Y at step S100), the controller 24 proceeds directly to step S104, where a feed pulse interval (i.e., ⅙", ⅛" or ½") is selected by the selector 124 according to the paper length (input from the operation panel 125 or the host computer 196). A default value may also be set such that, if no data is available from the operation panel 125 or the host computer 196 regarding the paper length, the paper length is set to, for example, 11". The controller 24 then reads threshold data stored in the EEPROM 127 and stores it in a RAM in the controller 24 (step S105).

The controller 24 then checks the paper top sensor 126 at step S106. If the paper top sensor 126 is OFF (N in step S106), then the paper P has not reached the paper top sensor 126. In this case, the top set operation shown in FIG. 16 and described below is initiated. If the paper top sensor 126 is ON (Y at step S106), then the paper P has reached the paper top sensor 126, and the controller proceeds to step S108. In step S108 through S112, the controller 24 starts the laser scanning unit 14, the main motor 82 for driving the developing unit 18, and the fixing unit motor 86 for driving the fixing unit 22, respectively.

At step S114, a counter A is set according to the predetermined interval L6 and the selected feed pulse interval. Defining the selected feed pulse interval as "m", the counter A is set to L6/m. After the counter A is set, a feed pulse interrupt process is enabled in step S116.

Figure 12:
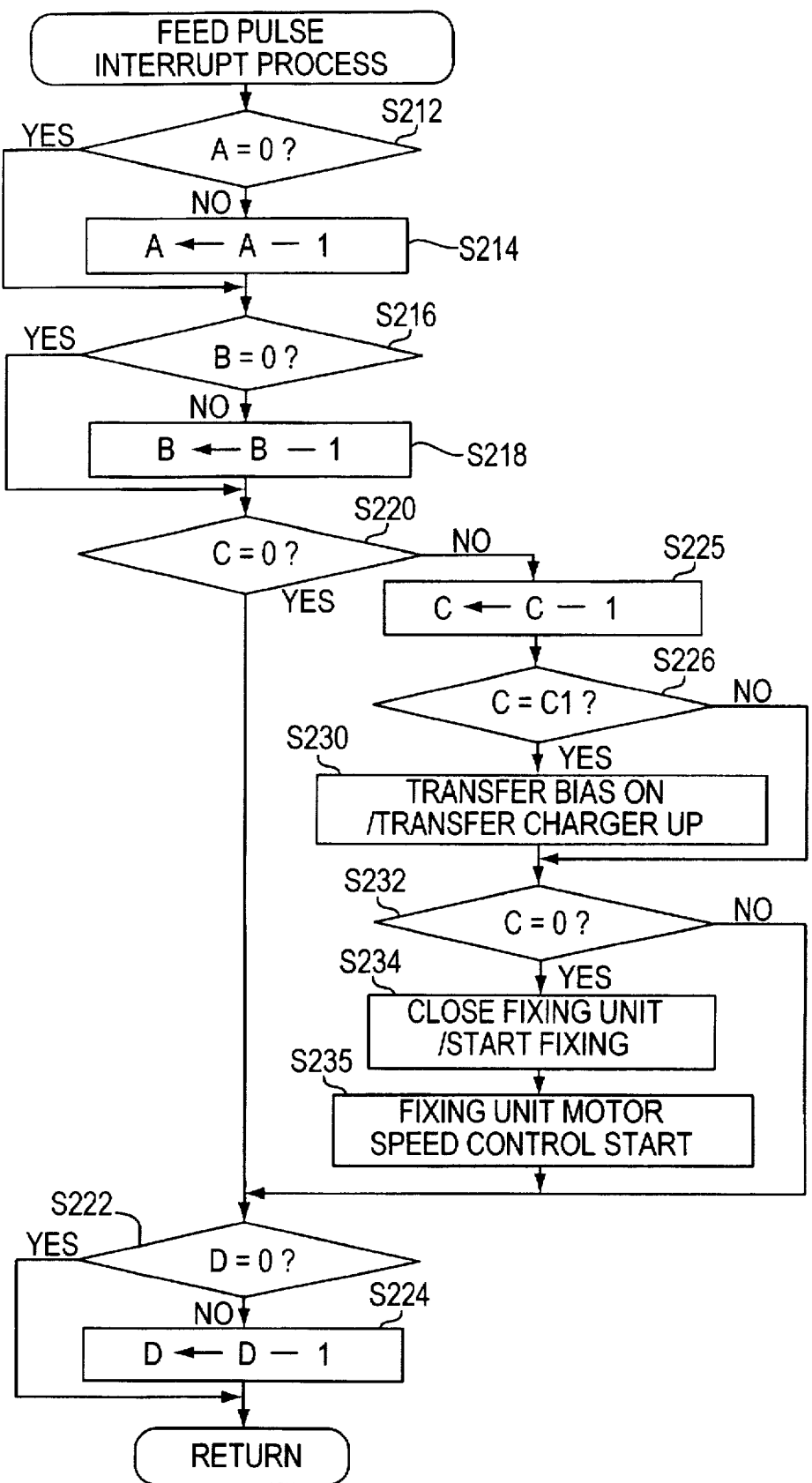
FIG. 12 is a flow chart showing a feed pulse interrupt process.

The feed pulse interrupt process is described with reference to FIG. 12. The feed pulse interrupt process interrupts a running process when the controller 24 receives a feed pulse from the selector 124. Generally, the feed control of the embodiment is performed by setting a certain value (based on the distance to be fed) in a counter, and decrementing the counter by 1 at every feed pulse sent to the controller 24. In particular, the controller 24 includes the counter A (described above) which is used for feed in the reverse direction, a counter B used for feed in the forward direction, and counters C and D used for controlling the pressure roller 130 or the like between a retracted position (retracted from the paper path) and an operating position. In FIG. 12, the controller 24 checks and conditionally decrements counters A, B, C and D in order (S212 through 224). More particularly, the counter A is checked to determine if it is zero (S212), and the counter A is only decremented by 1 if it is not zero (S214). Similarly, counters B and D are checked (S216, S222), and only decremented by 1 if they are not zero (S218, S224). The case wherein the counter C is not zero is described below with reference to steps S140, S142 of FIG. 13.

Referring again to FIG. 11, after the feed pulse interrupt process is enabled in step 116, the tractor motor 84 is then driven in reverse to retract the paper P in step S118. The controller 24 then loops through a check of the paper top sensor 126 and the counter A until either the paper top sensor 126 is OFF or A reaches zero, checking the paper top sensor 126 first (S120, S122). If the paper top sensor 126 turns OFF before the counter A reaches zero, it indicates that a top edge of the paper P has been located, for example, if the last printed page has been separated from the paper P outside the printer 10, and that the leading edge of the current page defines the next blank page to be printed. At this point, the tractor motor 84 is stopped (S204) and the controller 24 proceeds to a semi-top set process as described below with reference to FIG. 16.

If the counter A reaches zero before the top sensor 126 is turned OFF, it indicates that the top edge of the paper P has not been located, for example, if the printed page has not been separated, and that the printed page has been pulled back into the printer 10. In this case, the tractor motor 84 is stopped (S124), and the controller 24 proceeds to print the following page as described in FIG. 13.

Figure 13:
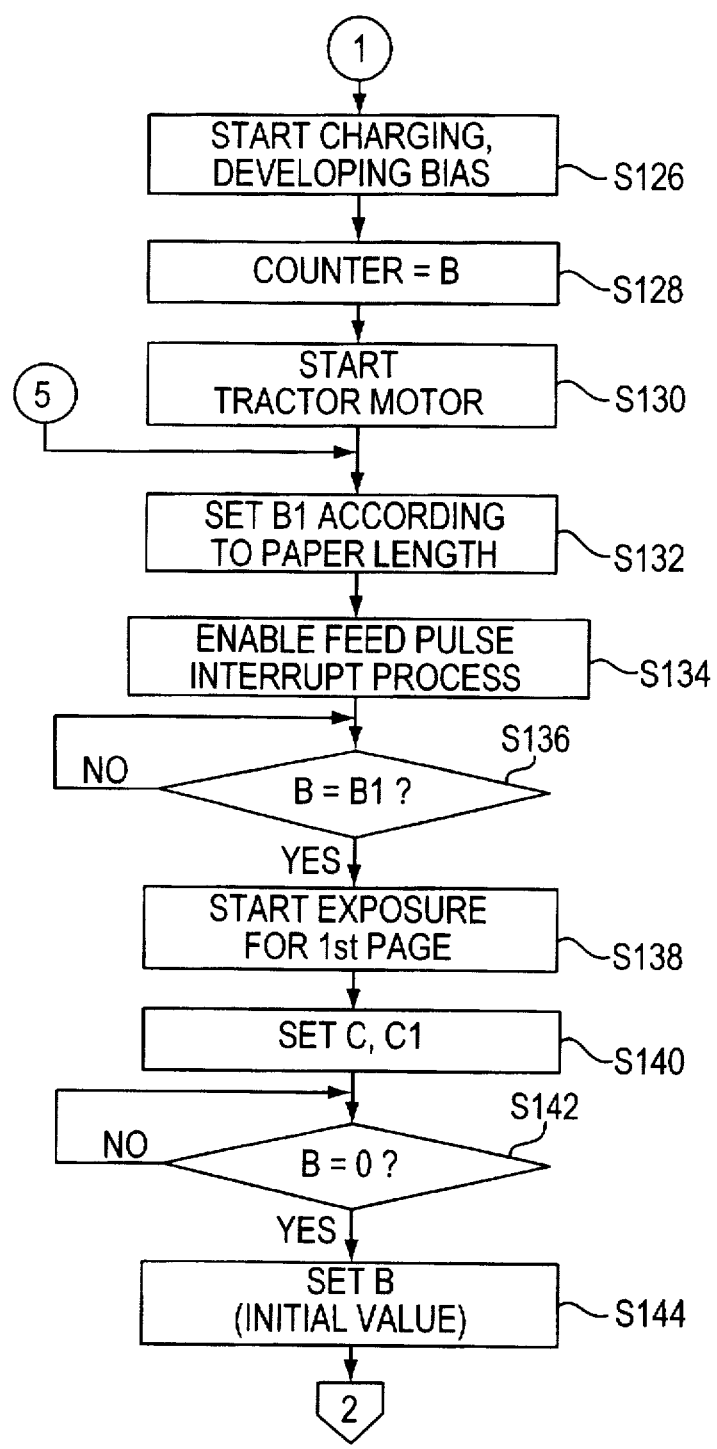
FIG. 13 is a flow chart showing a second part of the printing control process.

As shown in FIG. 13, in step S126, a bias voltage is applied to the charging unit 40 and the developer 18. At step S128, the counter B is set to (L1+L2)/m, based on the predetermined interval from the home position HP to the transfer position TP (L1+L2) and the selected feed pulse interval (m).

After B has been set, the controller 24 rotates the tractor motor 84 to transport the paper P (S130). At step 132, a count target B1 is set to L2/m, based on the interval from the exposure start position ESP to the transfer position TP (L2) and the selected feed pulse interval (m). After B1 has been set, the interrupt process is enabled (S134), decrementing B for every detection of a pulse from the selector 124 (S134). When the counter B reaches B1 (S136), indicating that the leading perforations of the first page to print have reached the exposure starting position ESP, the controller 24 starts the laser scanning unit 14 and the scanning unit 14 begins scanning to form a latent image onto the surface of the photoconductive drum 16 (S138) at the laser scanning point LSP. The latent image becomes a toner image on the photoconductive drum 16 as it passes the developing unit 18.

At this point, the counter C is set to L4/m, based on the interval L4 from the exposure starting position ESP to the fixing position FP. Further, a count target C1 is set at step S140 to (L4–L2)/m. The counter C is decremented when the pulse feed interrupt routine of FIG. 12 is called after a feed pulse is received by the controller 24. In particular, referring to FIG. 12, the counter C is decremented by 1 at step S225 and then when the counter C has reached the value C1 at step S226, indicating that the perforations of the next page are at the transfer position TP, a bias voltage is applied to the transfer charger 46 and the transfer unit 44 is moved into its operating position (S230). When the counter C is zero (S232), the pressure roller 130 is moved to abut the heat roller 128 for a fixing operation (S234). A detailed description of the operation of the fixing unit and transfer unit is omitted.

Referring back to FIG. 13, when the counter B reaches zero (S142), indicating that the leading perforations of the page to be printed have reached the transfer position TP, the controller 24 energizes the transfer unit 44 to begin transferring the toner image on the drum 16 to the paper P. Following step S142, the counter B is reset to (page length)/m, based on the paper length as set and the selected feed pulse interval (S144).

Figure 14:
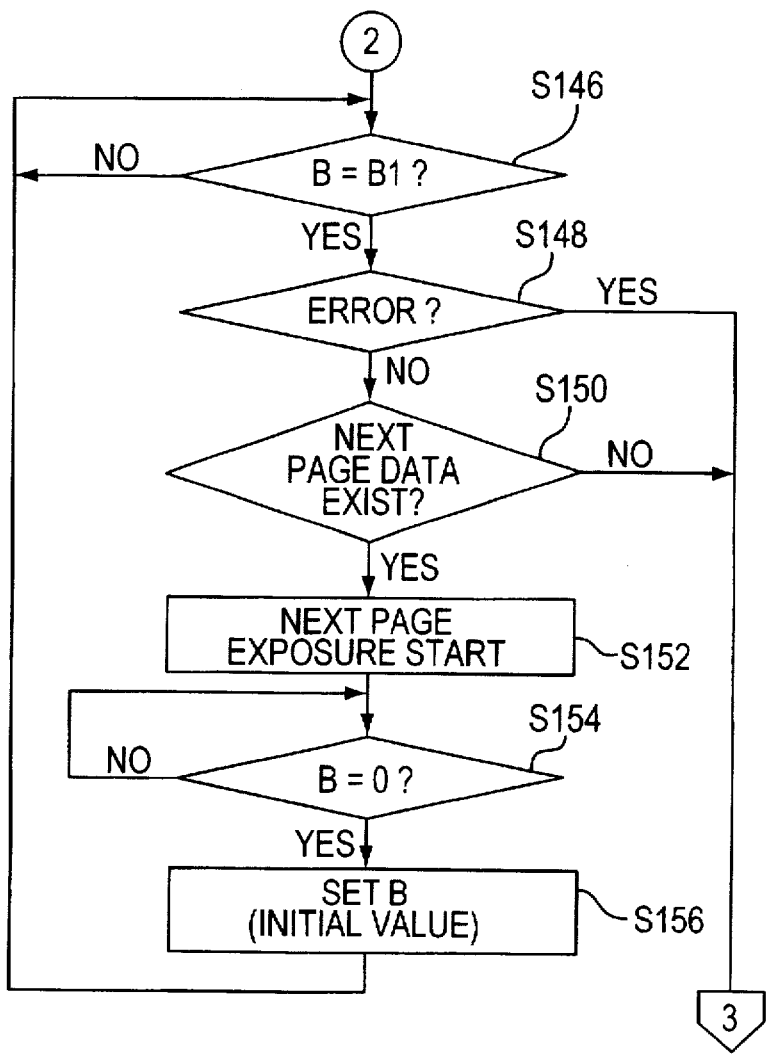
FIG. 14 is a flow chart showing a third part of the printing control process.
Figure 15:
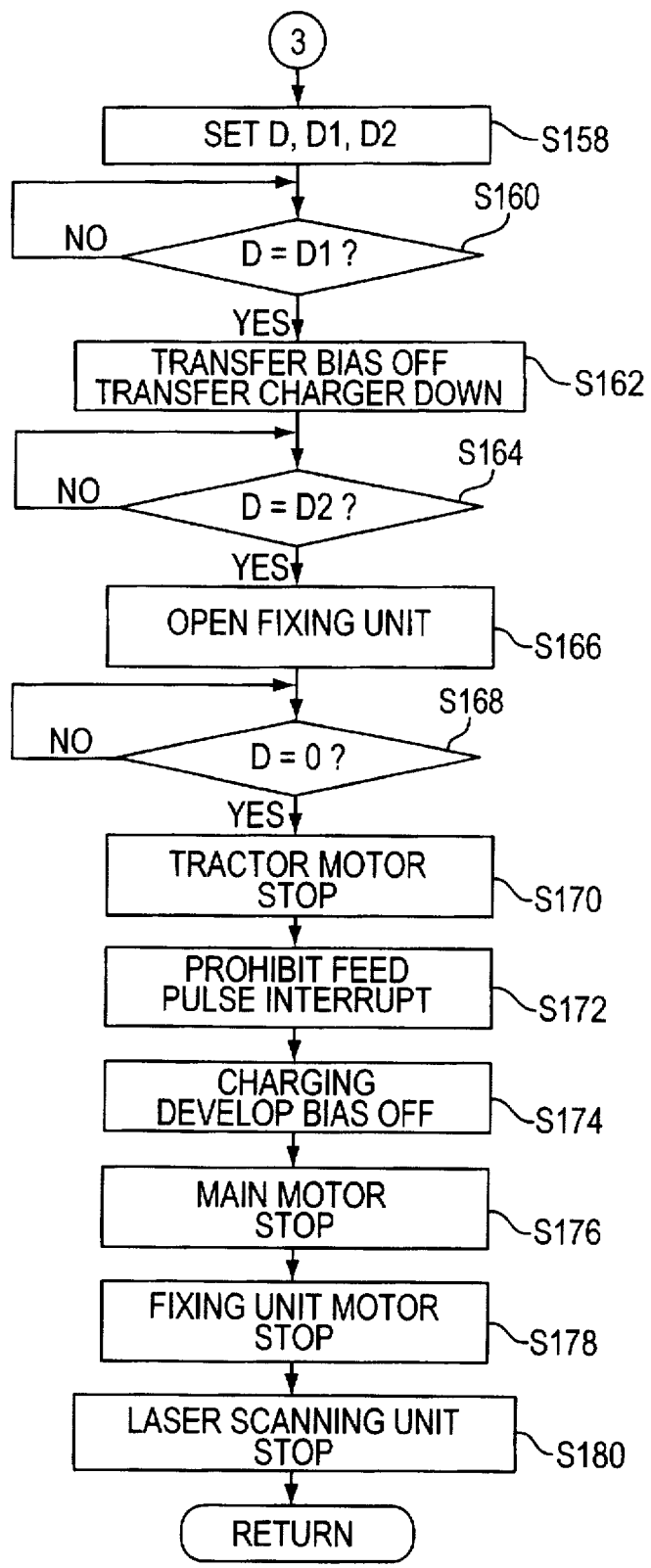
FIG. 15 is a flow chart showing a fourth part (print stop process) of the printing control process.

In step 144, the leading edge of the next page to be printed is defined. Continuous printing of successive pages is begun in FIG. 14. As shown in FIG. 14, when the counter reaches B1 (S146), indicating that the perforation of the next page has reached the exposure starting position ESP, an error check is performed (S148). If an error is detected, for example "toner out", "paper empty", or "no printing data" type errors (S150), the controller 24 proceeds to the print stop process (FIG. 15).

If no error is detected at step S148 or step S150, the controller 24 proceeds to expose the next latent image on the drum 16 and continues the printing process. At step S154, the counter B is again reset based on the paper P length as previously defined. In step S156, the leading edge of the page following the next page is defined, and the steps S145 through S156 are then repeated until no more printing data exists at step S150 (or until an error is detected at step S148), whereupon the controller proceeds to the print stop process as shown in FIG. 15.

During the print stop process, the feed pulse interrupt process of FIG. 12 continues to decrement the counter D for every feed pulse received by the controller 24. As shown in FIG. 15, the print stop process is initialized in step S158. A counter D is set to L5/m, based on the predetermined interval from the exposure start position ESP to the stop position SP (L5); a count target D1 is set to (value in D)–L2/m, based on the interval between the exposure start position ESP and the transfer position TP; and a target count D2 is set to (value in D)–L4/m, based on the interval between the exposure start position ESP and the fixing position FP.

When the counter D reaches the target value D1 (S160), indicating that the leading perforation defining the last printed page has reached the transfer position TP, the controller 24 stops the bias voltage to the transfer unit 44, and retracts the transfer unit 44 from the drum 16 (S162). When the counter D reaches D2 (S164), indicating that the perforations defining the last printed page has reached the fixing position FP, the controller 24 stops the fixing operation and moves the press roller 130 away from the heat roller 128 (S166). When the counter D value reaches zero (step S168), indicating that the perforation defining the last printed position has reached the stop position SP outside the printer 10, the controller 24 stops the tractor motor 84 (S170); prohibits the feed pulse interrupt process (S172); removes the biasing voltage from the charging unit 40 and the developing unit 18 (S174); stops the main motor 82 (S176); stops the fixing unit motor 86 driving the fixing unit 22 (S178); and stops the laser scanning unit 14 (S180).

The controller 24 controls the elements of the printer 10 so that the perforation of the last printed page reaches the stop position SP outside the printer 10 so that the operator may check or separate the last printed page.

Figure 16:
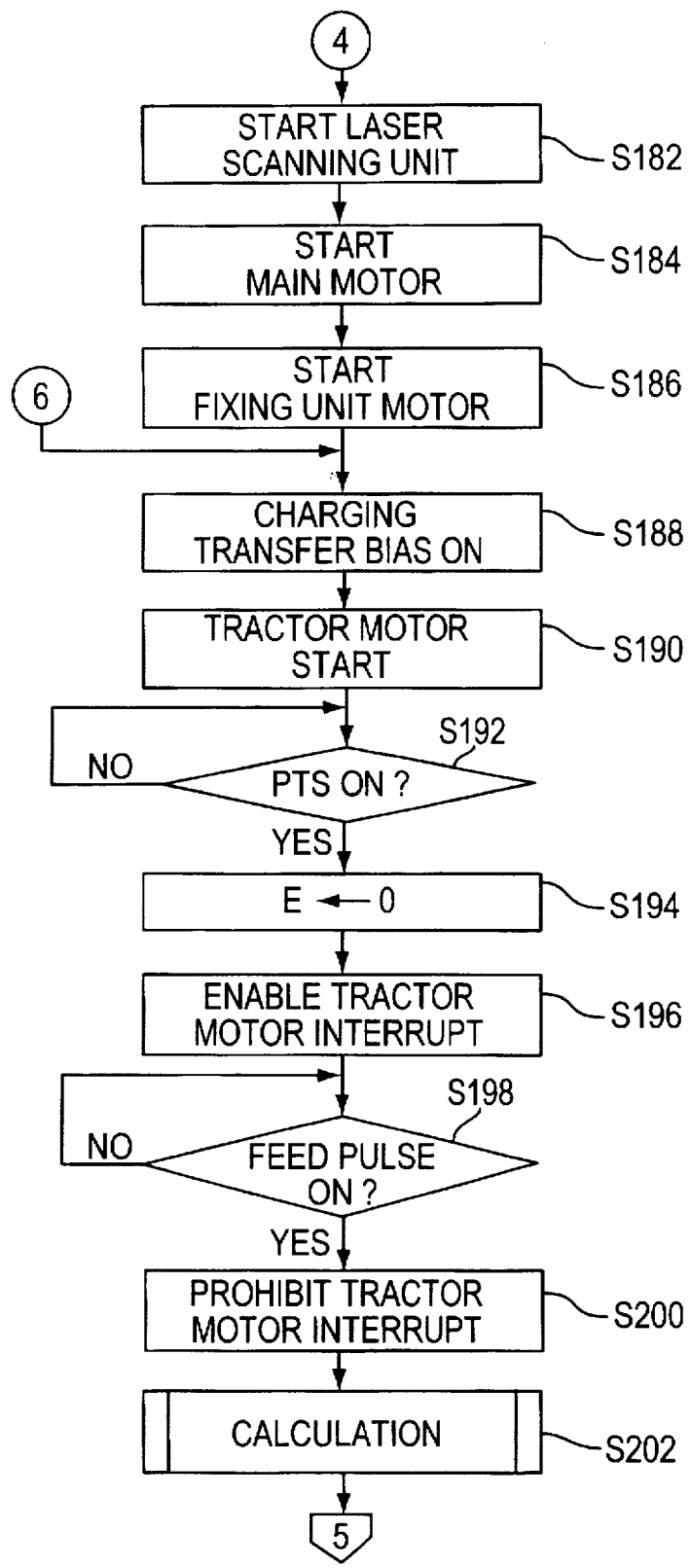
FIG. 16 is a flow chart showing a top set process of the printing control process.

FIG. 16 shows the top set operation, called at previously described step S106. The top set process is performed to find the perforations which are upstream from and closest to the exposure starting position ESP. The top set process is performed after the paper P is set in the printer, or following a retraction, to properly register the paper P before printing. A portion of the top set process serves as the semi-top set operation (called at previously described step S204).

At the beginning of the top set operation, the laser scanning unit 14 (S182), the main motor 82 driving the developing unit 18 (S184), and the fixing unit motor driving the fixing unit 22 (S186) are started, and a bias voltage is applied to the charging unit 40 and the developing unit 18 (step S188). The semi-top operation skips the first three steps (i.e., S182, S184, S186) as, in this case, the elements started in the three skipped steps have already been activated, the semi-top operation is otherwise identical to the top set operation.

Figure 17:
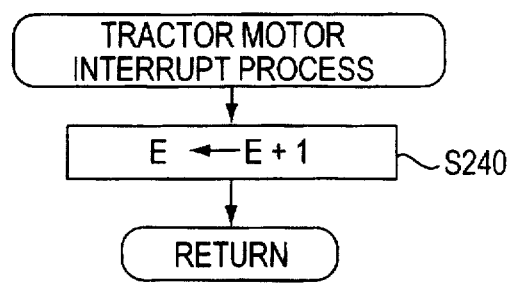
FIG. 17 is a flow chart showing a tractor motor phase pulse count interrupt process.

At step S190, the tractor motor 84 is rotated to transport the paper P (S190). The controller then loops until the paper top sensor 126 turns ON (S192), and then sets a motor pulse counter E to zero. The motor pulse interrupt is then enabled (S196). As the tractor motor 84 rotates, for every motor pulse of the tractor motor 84, the interrupt of FIG. 17 is activated. Thus, as shown in FIG. 17, the counter E is incremented by 1 for every phase pulse of the tractor motor 84 (S240) only when the tractor motor pulse interrupt is enabled. The motor pulses are sent to the controller 24 by a motor monitor circuit (not shown).

The controller then loops until the next feed pulse is sent to the controller 24 (S198). At this point, the motor pulse interrupt is prohibited (S200). The controller 24 then sets counter B to a value, representative of the distance from the transfer position TP to the nearest perforations upstream of the exposure start position ESP, according to the calculation of FIG. 18 (S202).

The calculation of step S202 of the top set process is described with reference to FIG. 18. Since the distance from the paper top sensor position PTS to the transfer position TP is L3−L2, the interval L from the transfer position TP to the nearest perforations upstream of the exposure start position ESP is determined according to:

$$L = page\ length * k - (L3-L2) \quad (1)$$

where k is an integral number of pages which can be located between the paper top sensor position PTS and the exposure start position ESP. As the counter B is set to a value L/m, when the counter B decreases from L/m to L2/m (step S136 in FIG. 13), it indicates that the perforation has reached the exposure start position ESP.

As shown in FIG. 4B, if a paper top signal (signal from the paper top sensor 126) that is intended to be generated before the feed pulse n is actually generated after the feed pulse n, the controller 24 may control the printer based on the feed pulse n+1 as the feed pulse related to the leading edge. This may cause a deviation of the printing position on the continuous paper.

Figure 18:
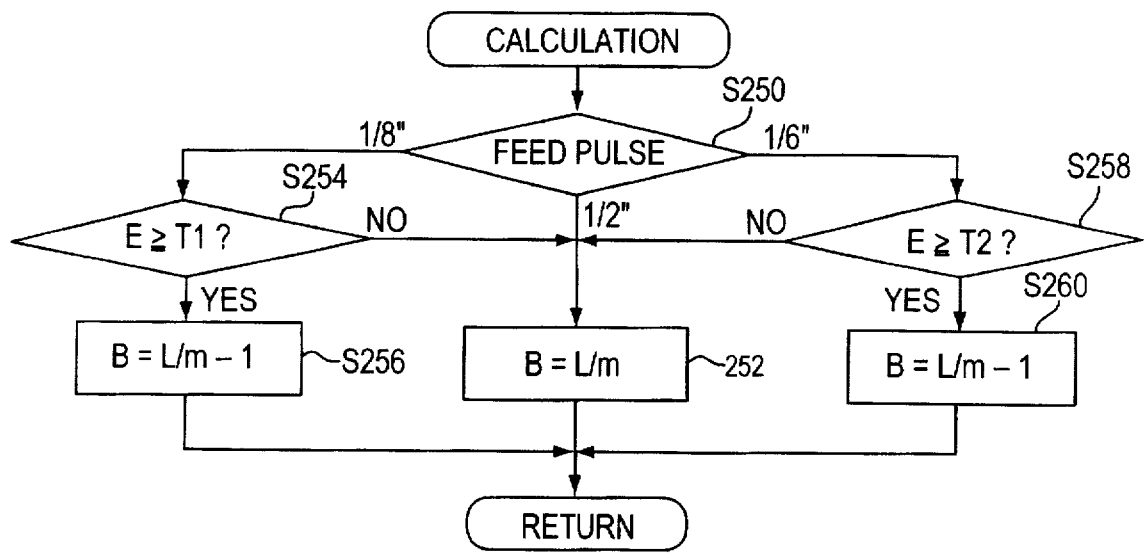
FIG. 18 is a flow chart showing a calculation of the top set process.

In order to prevent such deviation of the printing position, in the calculation shown in FIG. 18, the controller 24 compensates for a delay in the paper top signal by changing the value set in counter B from L/m to L/m−1, if the controller 24 determines that there is a delay in the paper top signal from the paper top sensor 126.

In particular, the controller 24 first checks which feed pulse interval is selected (S250). If the feed pulse of ½" is selected, no compensation is necessary since the estimated deviation of the paper top signal is too small compare with the interval of ½". Thus, the controller 24 proceeds to the step S252, where the counter B is set to L/m. If the feed pulse interval of ⅛" is selected, the controller 24 compares the counted motor pulse E and a threshold T1 (S254). If the counted motor pulse E is smaller than the threshold T1, the controller 24 proceeds to the step S252, where the counter B is set to L/m. If the counted motor pulse E is greater than or equal to the threshold T1, it indicates that the paper top signal is delayed as shown in FIG. 4B. Thus, the controller 24 proceeds to the step S256, where the counter B is set to L/m−1.

Similarly, if the feed pulse interval of ⅙" is selected, the controller 24 compares the counted motor pulse E and a threshold T2 (S258). If the counted motor pulse E is smaller than the threshold T2, the controller 24 proceeds to the step S252, where the counter B is set to L/m. If the counted motor pulse is greater than or equal to the threshold T2, the controller 24 proceeds to the step S260, where the counter B is set to L/m−1.

After the calculation is completed, the controller 24 proceeds to the printing process (the step S132 in FIG. 13).

In this embodiment, the thresholds T1 and T2 used in the above-mentioned compensation process are adjustable and therefore can be set after the assembly of the printer.

Figures 19A, 19B:
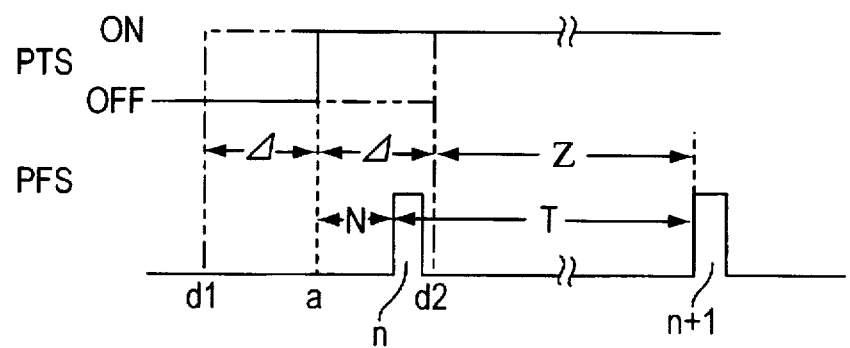
FIGS. 19A and 19B are timing charts showing a relationship between feed pulses and paper top signals.

FIGS. 19A and 19B are timing charts showing a relationship between feed pulses (PFS) and paper top signals (PTS). As shown in FIG. 19B, each threshold is defined as a value corresponding to the time interval Z from a most delayed paper top signal to the next feed pulse n+1. The deviation 2Δ of a paper top signal due to the irregularity of the paper leading edge is known based on experience. The time interval T between feed pulses is also known.

When using a paper having a regular leading edge and having a high rigidity so that the paper does not bend, it is expected that the paper top signal is generated at a correct time "a" shown in FIG. 19. The timing of the most delayed paper top signal can be determined by adding the known deviation Δ to the timing of the correct time "a". Accordingly, by measuring the time interval N from the correct time "a" to the closest feed pulse n, the thresholds T1 and T2 can be determined according to the following equation:

$$TH = (T+N-\Delta)/\Delta t \quad (2)$$

where TH is one of thresholds T1 and T2. T is one of ⅛" (when TH=T1) and ⅙" (when TH=T2). Δt the variable is a interval of the motor pulse of the tractor motor 84. The measurement of N is performed using ⅛" feed pulse and ⅙" feed pulse respectively.

Since EEPROM (shown in FIG. 9) is used for storing the thresholds T1 and T2, it is possible to set the thresholds T1 and T2 after each printer is assembled. Although the thresholds T1 and T2 are intrinsic properties of each printer (depending on the distance between the paper top sensor 126 and the tractor unit 20), according to the embodiment, it is possible to set suitable thresholds T1 and T2 for individual printers. The data stored in the EEPROM 127 is read by the controller 24 and stored in the RAM in the controller 24 in the step S105 of FIG. 11.

An example of the process for determining the thresholds T1 and T2 is now described. The controller 24 is connected to a testing device for testing respective units as shown in FIG. 9. The testing device is arranged to send various commands to the controller 24 to drive respective units.

Figure 2A:
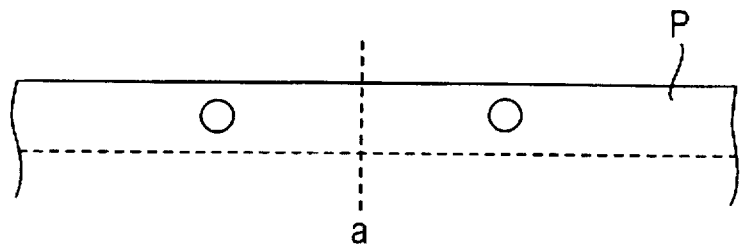
FIGS. 2A, 2B and 2C are schematic views showing a relationship between perforations and feed holes.
Figure 2B:
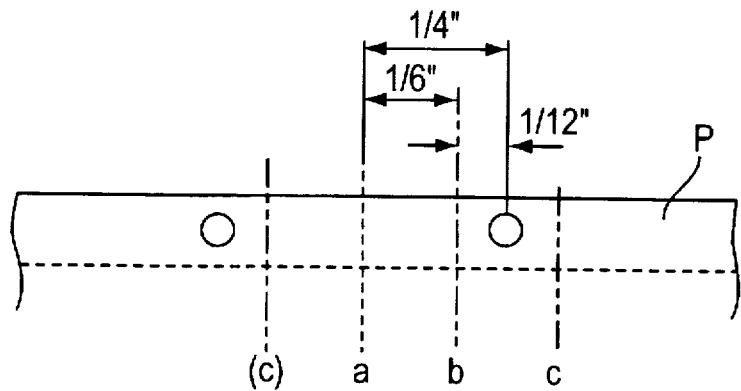
Figure 2C:
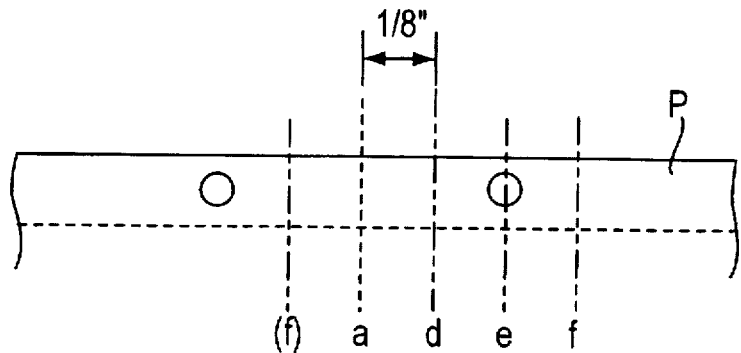

Two types of test sheets are used in this process, one of which has a page length being a multiple of ⅙" as shown in FIG. 2B, the other of which has a page length being a multiple of ⅛" as shown in FIG. 2C. Further, each of the test sheets has a high rigidity and has a regular leading edge. For example, a comparatively hard paper, plastic plate or metal plate may be used as a test sheet.

After the test sheet is set to the tractor unit 20, a control signal is sent from the testing device to the controller 24 for driving the tractor unit 20. The feed pulse is set to ⅙" or ⅛", according to the page length of the test paper. The testing device measures the time interval N from the paper top signal to the closest feed pulse by counting motor pulses (generated from the tractor motor 84). The interval N is determined by multiplying the counted number of motor pulses by the interval Δt of each motor pulse. Then, the thresholds T1 and T2 are determined according to the equation (2). The determined thresholds T1 and T2 are stored in the EEPROM 127.

According to the embodiment, since the thresholds T1 and T2 are adjustable and can be determined after the assembling of the printer, it is unnecessary to mount the paper top sensor 126 to the printer with high precision. Thus, the assembly of the printer can be relatively simple and the manufacturing time for assembling the printer can be reduced.

Figure 11:
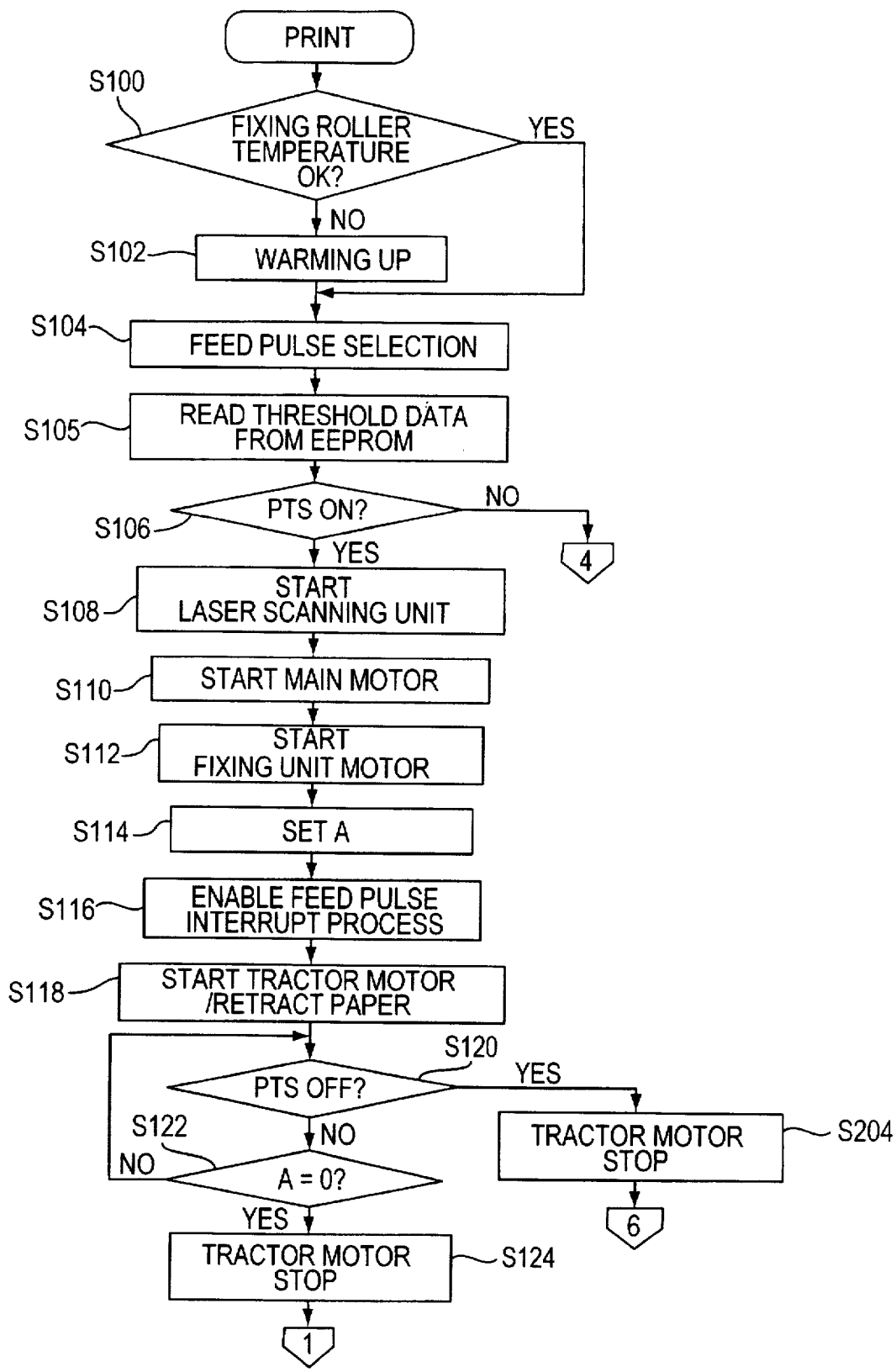
FIG. 11 is a flow chart showing a first part of a printing control process.

Although the threshold T1 and T2 are stored in the EEPROM 127 in this embodiment, it is possible to provided dip switches to the controller 24, for setting the threshold T1 and T2. Further, it is possible to store the value of the time interval N (corresponding to the threshold), and to arrange the controller 24 to calculate the threshold T1 and T2 at the beginning of the printing process (FIG. 11).

The present disclosure relates to subject matter contained in Japanese Patent Application No. HEI 08-111953, filed on Apr. 9, 1996, which is expressly incorporated herein by reference in its entirety.

What is claimed is:

1. A printer which prints on a continuous form paper, comprising:
   a tractor unit for feeding said paper;
   feed pulse generating means for generating a feed pulse responsive to a predetermined interval of feeding of said paper;
   a paper top sensor which detects the leading edge of said paper and generates a paper top signal;
   a non-volatile memory;
   comparing means for comparing a time interval from said paper top signal to said feed pulse with a threshold value; and
   a controller which controls said tractor unit and a printing operation onto said continuous form paper in accordance with said feed pulse, said controller being arranged to change the timing of starting said printing operation according to a result of said comparing means;
   wherein said threshold value is adjustable and can be stored in said non-volatile memory.

2. The printer according to claim 1, wherein said threshold value is determined by measuring a time interval between said paper top signal and said feed pulse, using a test sheet.

3. The printer according to claim 2, wherein said test sheet is rigid and has a uniform leading edge.

4. The printer according to claim 3, wherein said non-volatile memory is an EEPROM.

5. The printer according to claim 3, wherein said controller reads said threshold value from said non-volatile memory at the beginning of the printing operation.

6. The printer according to claim 1, wherein said setting of said threshold value is performed after said printer is assembled.

7. The printer according to claim 1, wherein said tractor unit comprises a tractor motor for feeding said continuous form paper, and wherein said comparing means detects said time interval by counting pulses generated in accordance with rotation of said tractor motor.

8. The printer according to claim 1, wherein said controller compensates for a delay of said paper top signal by changing said timing of starting said printing operation according to said result of said comparing means.

9. The printer according to claim 1, wherein said printer is an electro-photographic printer including a laser scanning unit for emitting light according to an image to be printed and a photo-conductive drum for receiving said light to form a latent image on said photo-conductive drum.

10. The printer according to claim 9, wherein said controller changes the timing of starting the control of said laser scanning unit according to said result of said comparing means.

11. The printer according to claim 1, wherein said continuous form paper has feed holes at a predetermined pitch on both edges of said continuous form paper, and wherein said continuous form paper has perforations extending perpendicular to a feeding direction at a predetermined interval along the direction of said feeding, said predetermined interval of said perforations defining a page length of said continuous form paper.

12. The printer according to claim 11, wherein said page length is a multiple of a predetermined value, and wherein said feed pulse generating means generates feed pulses responsive to a feeding interval of said predetermined value.

13. The printer according to claim 1, wherein said feed pulse generating means comprises a plurality of encoders which generate feed pulses responsive to different feeding intervals.

14. The printer according to claim 13, wherein said plurality of encoders are first and second encoders which respectively generate first and second feed pulses.

15. The printer according to claim 14, wherein a third feed pulse is created by combining said first pulse and second feed pulse.

16. The printer according to claim 15, wherein said first feed pulse is generated at intervals of ⅛ inch, said second feed pulse is generated at intervals of ⅙ inch, and said third feed pulse is generated at intervals of ½ inch.

17. The printer according to claim 11, wherein said tractor unit further comprises a pair of tractor belts with projections engaging said feed holes, driving pulleys for driving said tractor belts, said driving pulleys being provided with an encoder at a driving shaft of said pulleys.

18. The printer according to claim 17, said feed pulse generating means further comprising a detecting sensor for detecting the movement of said encoder.

19. The printer according to claim 18, said detecting sensor comprising a photo-interrupter arranged to detect the passage of slits of said encoder.

20. A printer using continuous form paper, comprising:
   a tractor unit which feeds said paper;
   at least one encoder which generates a feed pulse responsive to a predetermined interval of feeding of said paper;
   a paper top sensor which detects the leading edge of said paper and generates a paper top signal;
   a controller which controls said tractor unit and controls a printing operation onto said continuous form paper in accordance with said feed pulse; and
   a non-volatile memory;
   wherein said controller is arranged to compare a time interval between said paper top signal and said feed pulse with a threshold value and to change the timing of starting said printing operation in accordance with a result of said comparison of said time interval,
   and wherein said threshold value is adjustable and stored in said non-volatile memory.

* * * * *